US006993601B2

(12) United States Patent
Minami et al.

(10) Patent No.: US 6,993,601 B2
(45) Date of Patent: Jan. 31, 2006

(54) INTERFACE CARD INCLUDING SELECTABLE DATA TRANSMISSION ROUTE MODES INCLUDING FIRST TRANSMISSION ROUTE MODE VIA MEMORY BUFFER AND SECOND TRANSMISSION ROUTE MODE NOT VIA MEMORY BUFFER

(75) Inventors: Masato Minami, Sagamihara (JP); Satoshi Sakuragi, Yokohama (JP); Wataru Kakinoki, Yokohama (JP); Shinji Ushigami, Fujisawa (JP)

(73) Assignees: Murata Manufacturing Co., Ltd., Kyoto (JP); Workbit Corporation, Kanagawa (JP)

( * ) Notice: Subject to any disclaimer, the term of this patent is extended or adjusted under 35 U.S.C. 154(b) by 353 days.

(21) Appl. No.: 10/372,056

(22) Filed: Feb. 21, 2003

(65) Prior Publication Data
US 2003/0163620 A1    Aug. 28, 2003

(30) Foreign Application Priority Data
Feb. 22, 2002   (JP)   ............................. 2002-045717

(51) Int. Cl.
*G06F 13/00* (2006.01)
*G06F 9/00* (2006.01)
*G06F 7/06* (2006.01)
*G06F 13/10* (2006.01)
*H01R 9/22* (2006.01)

(52) U.S. Cl. .................. 710/38; 710/8; 710/9; 710/10; 710/13; 710/14; 710/34; 710/63; 710/64; 710/102; 710/301; 710/302; 710/313; 439/55; 439/74; 439/894; 439/945; 439/948; 235/486; 235/487; 235/492

(58) Field of Classification Search .............. 710/8–10, 710/13, 14, 38, 33, 63, 64, 102, 301, 302, 710/313; 439/55, 74, 894, 945, 948; 235/486, 235/487, 492
See application file for complete search history.

(56) References Cited

U.S. PATENT DOCUMENTS

| | | | |
|---|---|---|---|
| 5,812,827 A * | 9/1998 | McGrath ...................... 703/25 |
| 6,438,638 B1 * | 8/2002 | Jones et al. ................. 710/301 |
| 6,470,284 B1 * | 10/2002 | Oh et al. ....................... 702/64 |
| 6,481,629 B1 * | 11/2002 | Hirabayashi et al. ........ 235/487 |
| 6,684,283 B1 * | 1/2004 | Harris et al. ................ 710/302 |
| 6,738,259 B2 * | 5/2004 | Le et al. ..................... 361/737 |
| 6,807,597 B2 * | 10/2004 | Oh et al. ..................... 710/301 |
| 2001/0027032 A1 * | 10/2001 | Inomata et al. ............... 439/55 |
| 2003/0082961 A1 * | 5/2003 | Mowery et al. ............. 439/894 |

OTHER PUBLICATIONS

Aruther Huang, "CardBay—Next generation of PC card standard", Texas Instruments, Jul. 2001.*

* cited by examiner

Primary Examiner—Tammara Peyton
(74) Attorney, Agent, or Firm—Keating & Bennett, LLP

(57) ABSTRACT

An interface card includes data transmission routes which allow for data transmission in a plurality of data transmission modes and a mode selection switch for selecting a data transmission mode from the plurality of modes. With the interface card, a user is able to select an optimal data transmission mode for the environment.

21 Claims, 11 Drawing Sheets

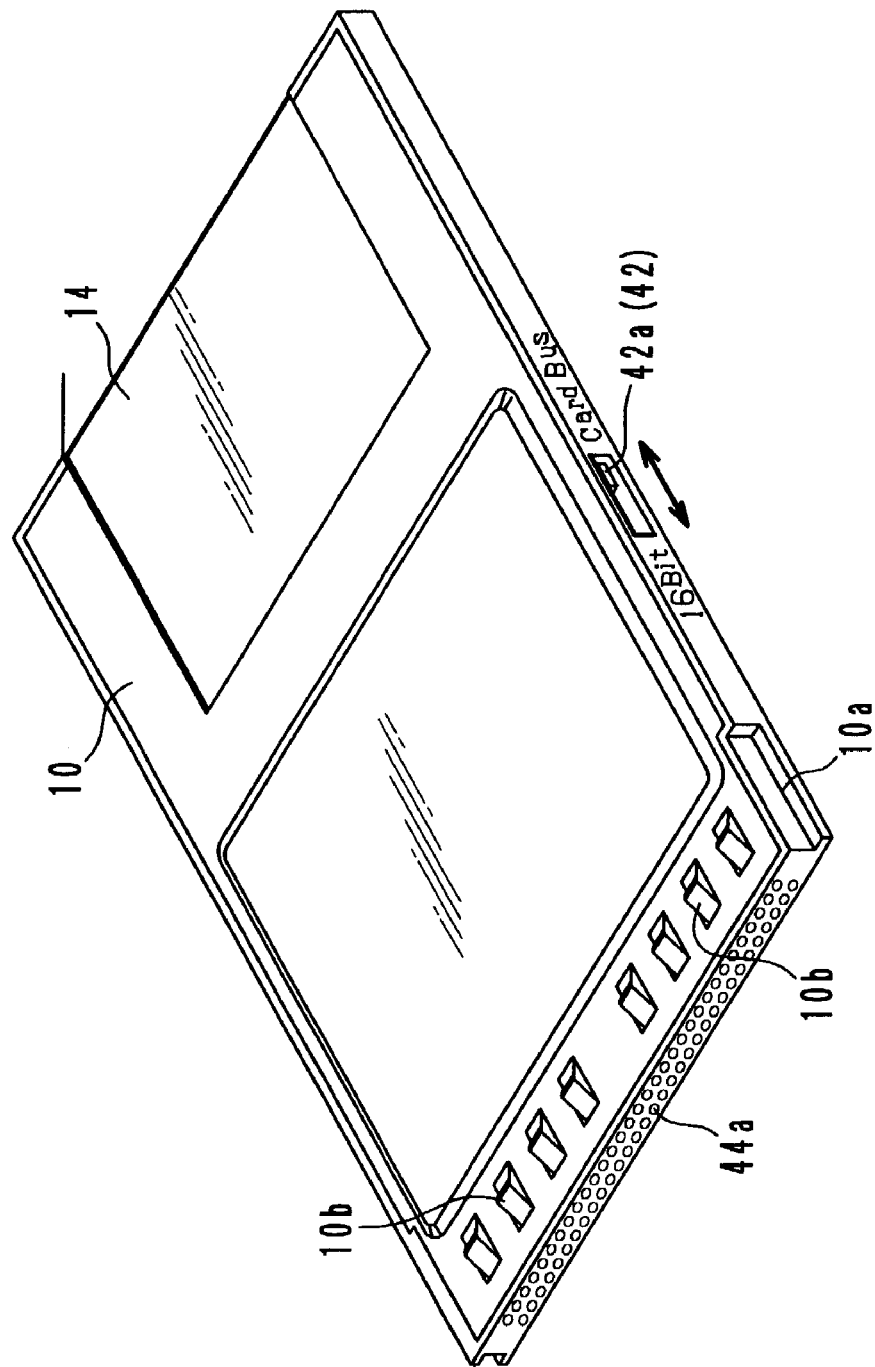

FIG. 6

| (a) 16-BIT WIDTH | PRIORITY | (b) CARD BUS | PRIORITY |
|---|---|---|---|
| (a1) I/O MAPPED I/O | 2 | (b1) DATA TRANSMISSION CONTROLLED BY CONTROL SECTION | 3 |
| (a2) MEMORY MAPPED I/O | 1 | (b2) BUS MASTER TRANSMISSION (1 BLOCK) | 2 |
| | | (b3) BUS MASTER TRANSMISSION (2 OR MORE BLOCKS) | 1 |

INTERFACE CARD INCLUDING SELECTABLE DATA TRANSMISSION ROUTE MODES INCLUDING FIRST TRANSMISSION ROUTE MODE VIA MEMORY BUFFER AND SECOND TRANSMISSION ROUTE MODE NOT VIA MEMORY BUFFER

BACKGROUND OF THE INVENTION

1. Field of the Invention

The present invention relates to an interface card for a medium (a small storage medium) which is inserted into a slot of an information processing device while holding the medium therein so as to allow for data transmission between the medium and the information processing device, which may be a personal computer or other processing device.

2. Description of Related Art

Interface cards which can be inserted into PC card slots of personal computers while holding media therein have been developed. The interface cards allow data stored in the media while being used in digital cameras, digital video cameras, mobile telephones and other apparatuses, to be used in information processing devices, such as personal computers.

FIG. 10 shows data transmission between an information processing device 62 and a medium (for example, compact flash™) 64 when a conventional interface card 60 is inserted in the information processing device 62. Both the data transmission and data input/output to/from the medium 64 are performed by data buses with a 16-bit width, and consequently, the data transmission between the information processing device 62 and the medium 64 is performed entirely by data buses with a 16-bit width. The data input/output speed to/from the medium 64 can be higher than the data transmission speed produced by a data bus with a 16-bit width. However, when the information processing device 62 and the medium 64 are connected to each other via data buses with a 16-bit width, it is impossible to perform higher-speed data transmission than the data transmission speed by use of data buses with a 16-bit width.

Meanwhile, a card bus mode in which data transmission is carried out via a data bus with a 32-bit width has been developed. When a conventional interface card is inserted in an information processing device which is compatible with the card bus mode, however, if data input/output to/from a medium is carried out via a data bus with a 16-bit width, data transmission between the information processing device and the medium-will be carried out entirely via data buses with a 16-bit width. Thus, even if the information processing device is compatible with the card bus mode, as long as a conventional interface card is used, the information processing device cannot utilize its full transmission performance, and high-speed data transmission between the information processing device and the medium is impossible.

In order to solve the problems described above, the inventors invented an interface card 70 with a memory buffer 76 shown in FIG. 11. A patent application which discloses the interface card 70 was filed in the Japanese Patent Office and assigned Japanese Patent Application No. 2000-294355. When the interface card 70 with the memory buffer 76 is inserted in an information processing device 72, data transmission between the information processing device 72 and the memory buffer 76 is carried out via data buses having a 32-bit width. Also, the data input/output to/from the medium via a data bus with a 16-bit width is carried out at a higher speed. Thus, the interface card 70 permits faster data transmission than the conventional interface card 60.

The interface card 70 shown by FIG. 11 works efficiently in an environment which is compatible with the card bus mode. However, when the information processing device is of an old type which is not compatible with the card bus mode, and even if the information processing device is compatible with the card bus mode, when the operating system is not compatible with the card bus mode, even with the interface card 70, faster data transmission is impossible.

Where various types of information processing devices and various types of operating systems exist, an interface card which is compatible with only one data transmission mode is not able to permit full-speed data transmission between an information processing device and a medium. There may be users which do not know the data transmission mode that is suitable for the environment. Even if users know the suitable data transmission mode, it is inconvenient and costly for users to have different types of interface cards for various types of environment. For these reasons, an interface card which is compatible with different data transmission modes and which can select a data transmission mode that is suitable for the particular environment.

At present, these problems are caused by differences in specifications between a 16-bit-wide data bus mode and a card bus mode and/or variations among information processing devices and operating systems in compatibility with the card bus mode. As new specifications of data buses and new input/output specifications of media are developed and proposed in the future, similar problems will occur.

SUMMARY OF THE INVENTION

In order to overcome the above-described problems, preferred embodiments of the present invention provide an interface card which includes a data transmission mode selecting device which permits selection of an optimal data transmission mode for any environment.

According to a first preferred embodiment of the present invention, an interface card for a medium which is inserted into and ejected from a card slot of an information processing device while holding a medium therein and which has a data transmission route used for data transmission between the information processing device and the medium, includes a memory buffer which stores data transmitted through the data transmission route, and a data transmission mode selecting device for selecting a data transmission mode from a plurality of data transmission modes. In the interface card, the plurality of data transmission modes can be selected for data transmission through the data transmission route, and different data transmission modes are selected for data transmission between the information processing device and the memory buffer and for data transmission between the medium and the memory buffer. With the interface card described above, a user selects an optimal data transmission mode for the environment from the plurality of modes. The data transmission mode selecting device may be a mechanical switch (hard switch) which is operated by hand. Since a data transmission mode is used for data transmission between the information processing device and the memory buffer while another data transmission mode is used for data transmission between the medium and the memory buffer, both the data transmission between the information processing device and the buffer memory and the data transmission between the medium and the buffer memory is performed in the optimal modes for the respective data transmission, which results in efficient data transmission.

According to a second preferred embodiment of the present invention, an interface card for a medium which is inserted into and ejected from a card slot of an information processing device while holding a medium therein and which has a data transmission route used for data transmission between the information processing device and the medium, includes a memory buffer which stores data transmitted through the data transmission route, and a data transmission mode selecting device for selecting a data transmission mode from a plurality of data transmission modes. In the interface card, the plurality of data transmission modes are used for data transmission through the data transmission route, and the data transmission route includes a route for data transmission between the information processing device and the medium via the memory buffer and a route for data transmission between the information processing device and the medium not via the memory buffer. Further, a data transmission mode which uses the route via the memory buffer and a data transmission mode which uses the route not via the memory buffer are selectable with the data transmission mode selecting device. Depending on the environment, there may be cases wherein the data transmission route via the memory buffer cannot be used. The interface card which also has a data transmission route which does not transmit via the buffer memory can cope with such cases.

According to a third preferred embodiment of the present invention, an interface card for a medium which is inserted into and ejected from a card slot of an information processing device while holding a medium therein and which has a data transmission route used for data transmission between the information processing device and the medium, includes a memory buffer which stores data transmitted through the data transmission route, and a data transmission mode selecting device for selecting a data transmission mode from a plurality of data transmission modes. In the interface card, the plurality of data transmission modes are used for data transmission through the data transmission route, and a data transmission mode to carry out data transmission via the memory buffer is selectable with the data transmission mode selecting device. Further, the memory buffer is configured such that a host control section for controlling data transmission between the information processing device and the memory buffer and a medium control section for controlling data transmission between the medium and the memory buffer can perform data reading from the memory buffer and data writing into the memory buffer, respectively, in parallel and vice versa. With this structure, data reading from the memory buffer and data writing into the memory buffer are carried out in parallel, which greatly increases data transmission speed.

According to the third preferred embodiment of the present invention, the interface card preferably includes the medium control section therein. If the medium control section is provided in the medium, the capacity of the medium will be decreased and the size of the medium will be increased. If a CPU of the information processing device is used as the medium control section, the processing speed of the information processing device decreased. By providing the medium control section in the interface card, these problems are avoided.

Also, the interface card according to the third preferred embodiment of the present invention preferably includes the host control section therein. In this case, the host control section replaces the CPU of the information processing device as a bus master to control data transmission between a memory of the information processing device and the memory buffer. Thereby, data is transmitted much faster, and the load on the CPU of the information processing device is greatly reduced.

Further, the interface card according to the third preferred embodiment of the present invention preferably includes an instructing information producing section which reads information about a data storing status of the memory buffer and which produces instructing information to allow the media control section and/or the host control section to perform data transmission via the memory buffer. With this arrangement, the medium control section and/or the host control section recognizes the data storing status of the memory buffer accurately at all times, and the load on these control sections to obtain such information is minimized. Consequently, data transmission is performed more efficiently.

According to a fourth preferred embodiment of the present invention, a program for performing data transmission between the information processing device and the medium via one of the above-described interface cards according to preferred embodiments of the present invention commands the information processing device to execute the steps of reading information about a data transmission mode selected with the data transmission mode selecting device, reading information about a data transmission mode which the information processing device is compatible with, and selecting a data transmission mode to be used for data transmission from a group including the data transmission mode selected with the data transmission mode selecting device and the data transmission mode which the information processing device is compatible with, in consideration of a data transmission speed. In determining a data transmission mode for data transmission between the information processing device and the medium via the interface card, a data transmission mode which the information processing device is compatible with is selected from the plurality of modes, and by carrying out the determined data transmission mode, faster and more efficient data transmission is achieved.

Following the program, the information processing device may use a data transmission mode which uses memory mapped I/O of the system memory of the information processing device. In a mode which uses mapped I/O, while the data transmission control section (that is, the control section of the information processing device) performs data reading and data writing, instruction decoding is necessary. This instruction decoding is time consuming. In the mode which uses memory mapped I/O, on the other hand, the data transmission control section allocates an address for an I/O device (in this case, the memory buffer) to the same address location as an instruction program memory and a data memory. Thus, instruction decoding is not necessary. Therefore, the mode which uses memory mapped I/O achieves simpler and faster data transmission. The advantages and benefits of using memory mapped I/O are especially remarkable when the mode is used for 16-bit-wide data transmission.

The program according to the fourth preferred embodiment preferably further commands the information processing device to execute the step of starting data transmission between the information processing device and the memory buffer. Thereby, the control section of the information processing device controls execution of data transmission between the information processing device and the memory buffer.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 3 is a perspective view of the interface card according to a preferred embodiment of the present invention and a medium which is inserted in the interface card;

FIG. 6 is a chart which shows an example of selectable data transmission modes;

DETAILED DESCRIPTION OF PREFERRED EMBODIMENTS

Figure 1:
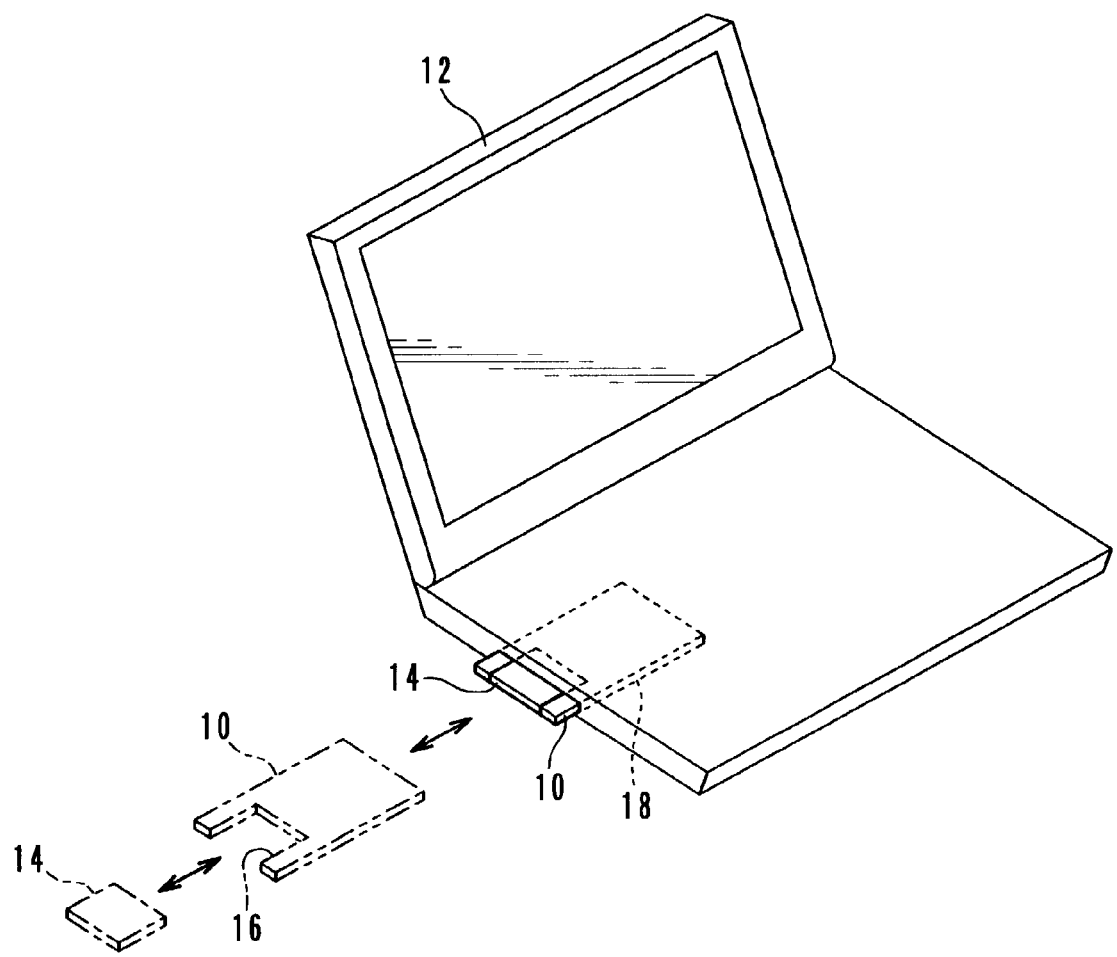
FIG. 1 is a perspective view of an information processing device with an interface card according to a preferred embodiment of the present invention inserted therein.
Figure 2:
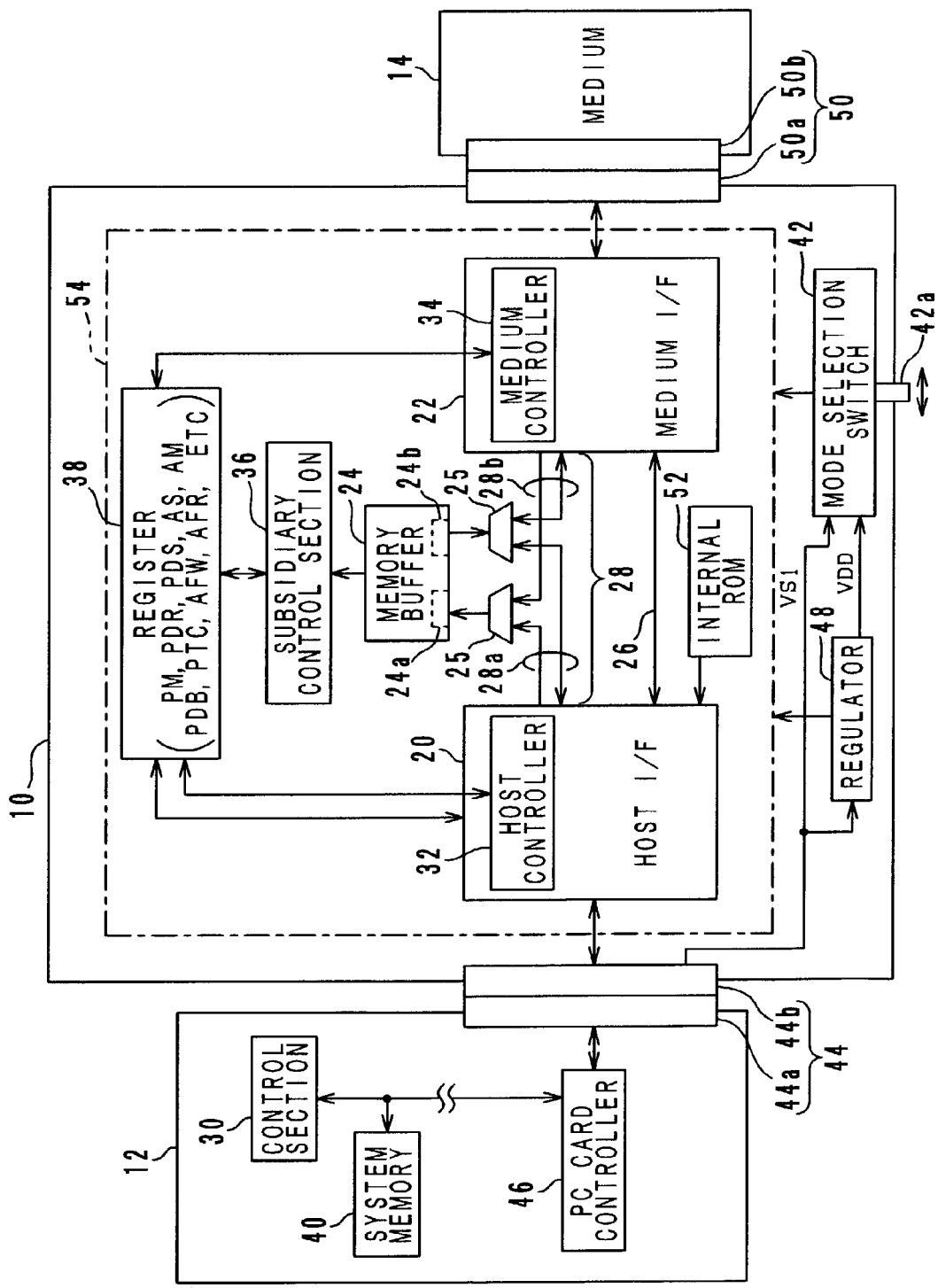
FIG. 2 is a block diagram which shows the circuit structure of the interface card according to a preferred embodiment of the present invention, an information processing device and a medium.

Preferred embodiments of the present invention will be described with reference to the accompanying drawings. FIG. 1 is a perspective view of an interface card 10 according to a preferred embodiment of the present invention and an information processing device 12. FIG. 2 is a block diagram of the interface card 10, a portion of the information processing device 12 and a portion of a medium 14. FIG. 3 is a perspective view of the interface card 10 showing the side with ground electrode projections 10b provided thereon.

As FIG. 1 shows, the interface card 10 is a card type adapter which provides data transmission between the information processing device (for example, a personal computer) 12 and a medium 14. The interface card 10 allows the information processing device 12 to read data from the medium 14 and to write data into the medium 14. The interface card 10 includes a mounting port 16 in which a medium 14 is fitted, and the interface card 10 is inserted into a card slot 18 of the information processing device 12 while holding the medium 14 in the mounting port 16. The medium 14 may be a small storage medium (memory card) or a small I/O card, such as a compact flash™, an SD™ memory card, a multimedia medium™, a smart media™, a memory stick™, a small PC card™, or other suitable type of card or storage medium.

As FIG. 2 shows, the interface card 10 and the information processing device 12 are connected to each other via host connectors 44 (44a, 44b), and the interface card 10 and the medium 14 are connected to each other via medium connectors 50 (50a, 50b). The interface card 10 includes an interface circuit 20 for the information processing device (which will be hereinafter referred to as a host I/F), an interface circuit 22 for the medium (which will be hereinafter referred to as a medium I/F) and a memory buffer 24 which temporarily stores data to be transmitted between the information processing device 12 and the medium 14. Further, between the host I/F 20 and the medium I/F 22, a first data transmission route 26 which is a direct route and a second data transmission route 28 via the memory buffer 24 are provided in parallel.

Since the memory buffer 24 temporarily stores data, different transmission modes (for example, which are different in bit-width) can be used for data transmission between the memory buffer 24 and the information processing device 12 and for data transmission between the memory buffer 24 and the medium 14. Thereby, for example, it is possible to perform 32-bit-wide data transmission in accordance with the card bus mode in the data transmission route 28a between the memory buffer 24 and the host I/F 20 while performing 16-bit-wide data transmission in the data transmission route 28b between the memory buffer 24 and the medium I/F 22. When a conventional interface card is used, data transmission is performed entirely via data buses with a 16-bit width, and the merit of higher-speed input/output to/from the medium is not utilized. On the other hand, when this interface card 10 is used, the card bus mode can be used, and the data transmission speed via data buses increases. Also, the merit of high-speed input/output to/from the medium are effectively utilized, and consequently, the data transmission speed is greatly improved. Further, data transmission between the memory buffer and the medium may be serial transmission.

The memory buffer 24 is preferably configured as a dual port RAM, such that data reading from a region of the memory buffer 24 and data writing into another region is performed simultaneously. With this structure, the data transmission speed is greatly increased, as compared with a structure in which a single data transmission control section carries out data reading/data writing from/into the memory buffer 24. The memory buffer 24 shown in FIG. 2 includes a data writing port 24a and a data reading port 24b. In accordance with the state of a selector 25 provided in the interface card 10, either the host I/F 20 or the medium I/F 22 is connected to the data writing port 24a, and the other is connected to the data reading port 24b.

The first data transmission route 26 is used for data transmission in the environment which does not allow data transmission via the memory buffer 24. (The environment includes the type of the information processing device 12 in which the interface card 10 is inserted and the operation system installed in the information processing device 12.) The bit width of the first data transmission route 26 is set to, for example, a bit width that is not less than the bit width of data input/output from/to the medium 14.

Data transmission between the memory buffer 24 and the information processing device 12 is controlled by, for example, a control section (i.e., CPU) 30 of the data processing device 12 or a host controller 32 provided in the host I/F 20. Data transmission between the memory buffer 24 and the medium 14 is controlled by, for example, a media controller 34 provided in the medium I/F 22 of the interface card 10. Data transmission via the first data transmission route 26 is controlled by, for example, the control section 30 of the information processing device 12.

Further, a subsidiary control section 36 which assists the above-described data transmission control sections (namely, the control section 30, the host controller 32 and the medium controller 34) is provided in the interface card 10. The subsidiary control section 36 preferably works in parallel to the data transmission control sections. The subsidiary control section 36 collects information about the data storing status of the memory buffer 24 and about the status of data transmission via the memory buffer 24 and produces information (for example, a data storage parameter which will be described later or other data) to allow the data transmission control sections to perform data transmission via the memory buffer 24. Control of data transmission by the data transmission control sections and the subsidiary control section 36 will be described later in detail.

In the interface card 10, a register 38 for storing various types of parameters which are used for data transmission (especially for data transmission through the second data transmission route 28 via the memory buffer 24) is provided. The data transmission control sections carry out data transmission by referring to the parameters stored in the register 38. For example, the following parameters are stored in the register 38: a parameter PM which indicates the determined data transmission mode, a parameter PDR which indicates the direction of data transmission, a parameter PDS which indicates the volume of data to be transmitted (for example, the number of bytes), the address AFW in the memory buffer 24 for writing, the address AFR in the memory buffer 24 for reading, the address AS in the system memory 40 (for example, the address for reading or storing data or the address in a table to be referenced) of the information processing device 12, the address AM in the medium to be accessed, a data storing parameter PDB which indicates the data storing status of the memory buffer 24 and a transmitted data counter PTC. The storage and updating of the parameters in the register 38 are carried out by the subsidiary control section 36 or the data transmission control sections.

Figure 4A:
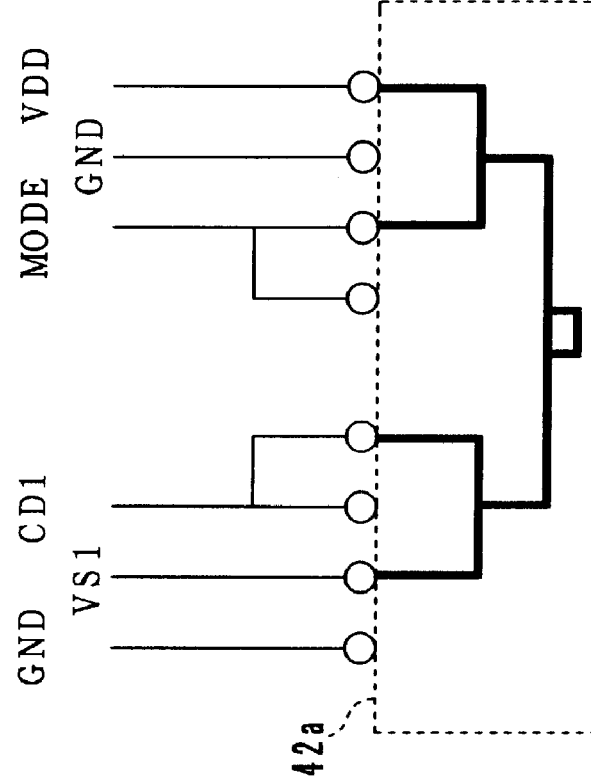
FIGS. 4a and 4b are illustrations of a mode selection switch of the interface card according to a preferred embodiment of the present invention.
Figure 4B:
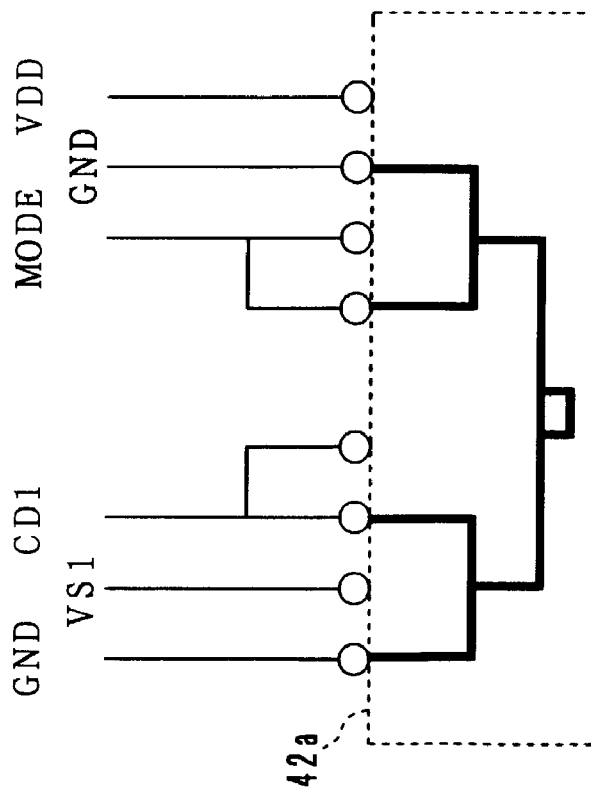

The interface card 10 allows data transmissions in different data transmission modes which are suitable for various types of environments. Accordingly, the interface card 10 includes a data transmission mode switching device which allows the user to select from various data transmission modes. As FIGS. 2 and 3 show, the data transmission mode switching device may include, for example, a mechanical switch 42. In the case of FIGS. 2 and 3, the switch 42 is located on a side surface at a position within the card slot 18 when the interface card 10 is inserted in the information processing device 12. The switch 42 is used to select one of a plurality of data transmission modes (for example, a first transmission mode for carrying out 16-bit-wide data transmission and a second transmission mode for carrying out 32-bit-wide data transmission which is compatible with the card bus mode (only between the information processing device 12 and the memory buffer 24)). In the mode selection switch 42, for example, depending upon the position of a movable element, either a high voltage or a low voltage is supplied to a specified signal line which is used for recognition of the transmission mode. Now, referring to FIGS. 4a and 4b, an example of the mode selection switch 42 is described. The exemplary switch 42 is used to select either a first transmission mode for carrying out 16-bit-wide data transmission or a second data transmission mode for carrying out 32-bit-wide data transmission. FIG. 4a shows the position of the movable element and the connecting status of the signal lines when the first data transmission mode is selected. FIG. 4b shows the position of the movable element and the connecting status of the signal lines when the second data transmission mode is selected. The mode selection switch 42 shown in FIGS. 4a and 4b is a two-pole two-contact switch 42. In FIGS. 4a and 4b, "VS1" and "VDD" denote signal lines for supplying signal voltages. "CD1" denotes a signal line connected to the information processing device 12 via the host connectors 44 (44a and 44b shown in FIG. 2) to permit the information processing device 12 (specifically the control section 30 or the card controller 46 thereof shown in FIG. 2) to recognize the selected data transmission mode. "GND" denotes a ground line. "MODE" denotes a signal line which permits the interface card 10 (specifically the host controller 32 or the subsidiary control section 36 thereof shown in FIG. 2) to recognize the selected data transmission mode. As FIG. 4a shows, when the movable element 42a is in a position (the left position in FIG. 4a) to select the first data transmission mode, the signal line CD1 is connected to the line GND, and the signal line MODE is connected to the line GND. Thus, both the signal lines CD1 and MODE are at a low level. From this status, the information processing device 12 and the interface card 10 determine that the first data transmission mode is selected. As FIG. 4b shows, when the movable element 42a is in a position (the right position in FIG. 4b) to select the second data transmission mode, the signal line CD1 is connected to the line VS1, and the signal line MODE is connected to the line VDD. Thus, both the signal lines CD1 and MODE are at a high level. From this status, the information processing device 12 and the interface card 10 determine that the second data transmission mode is selected. In this example, it is possible to supply voltages to the lines VS1 and VDD from an arbitrary power source. For example, it is possible to supply voltages from the information processing devices 12 via the host connectors 44.

The interface card 10 is supplied with electric power from the information processing device 12 via the host connectors 44. As FIG. 2 shows, the interface card 10 has a regulator 48 which reduces the voltage supplied from the information processing device 12 to a voltage to operate the elements of the interface card 10. When different voltages are required for different data transmission modes (for example, when the voltage to operate a PC card with a 16-bit-wide data bus is 5V, and when the voltage to operate a PC card which is compatible with the card bus mode (with a 32-bit-wide data bus) is 3.3V), preferably, the operating voltage of the interface card 10 is set to be not more than the lowest of the different voltages, and the regulator 48 produces the operating voltage from the voltage supplied from the information processing device 12. With this arrangement, application of a voltage over the operating voltage (or a tolerable voltage) to the medium, which damages the circuit, is effectively avoided.

As already mentioned, different voltages are required to operate a PC card with a 16-bit-wide data bus and to operate a PC card which is compatible with the card bus mode. In a conventional interface card which accepts a PC card with a 16-bit-wide data bus, protrusions (not shown) for preventing a card bus type PC card from being fitted in the slot are provided in the rear side of the card slot, such that the voltage to operate a PC card with a 16-bit-wide data bus is never applied to a card bus type PC card. In the interface card 10 according to this preferred embodiment, on the other hand, as FIG. 3 shows, recesses 10a which engage with the protrusions are provided such that the interface card 10 accepts both of these two types of PC cards.

A conventional card bus type PC card includes projections for connecting the ground line of the PC card to the ground line of an information processing device, and a card slot which is compatible with the card bus mode includes holes which receive the projections of the card bus type PC card. However, in a card slot (connector) for 16-bit-wide data transmission, such holes are not provided. Therefore, if a conventional card bus type PC card with ground line connector projections is inserted into a card slot for 16-bit-wide data transmission, the card slot or the connector projections may be deformed or damaged. The interface card 10 according to this preferred embodiment, on the other hand, as FIG. 3 shows, includes spring type ground line connector projections 10b which are retractable into substantially rectangular holes provided on the surface of the card 10. With this arrangement, this interface card 10 can be fitted in both a card slot for 16-bit-wide data transmission and a card slot for the card bus mode, and connection of a ground line to a card slot (connector) for the card bus mode is ensured.

As FIG. 2 shows, the host I/F 20, the medium I/F 22, the memory buffer 24, the data transmission routes 26, 28, the host controller 32, the medium controller 34, the subsidiary control section 36 and the internal ROM 52 may be defined, for example, by an integrated LSI 54. The ROM 52 is stored with attribute information of the interface card 10 which is required to carry out the data transmission modes (for example, a 16-bit-wide data transmission mode and a data bus transmission mode). The information stored in the ROM 52 is referenced by the information processing device 12 (specifically, the control section 30 thereof) and is used for determination of a data transmission mode and for execution of data transmission.

The control section 30 of the information processing device 12 operates, for example, via a program (device driver) stored in a program storing section (not shown) which may be, for example, a region of a system memory 40. Thereby, the control section 30 is capable of working as a data transmission control section and also as a data transmission mode determining section which determines an optimal data transmission mode for the information processing device 12.

Figure 5:
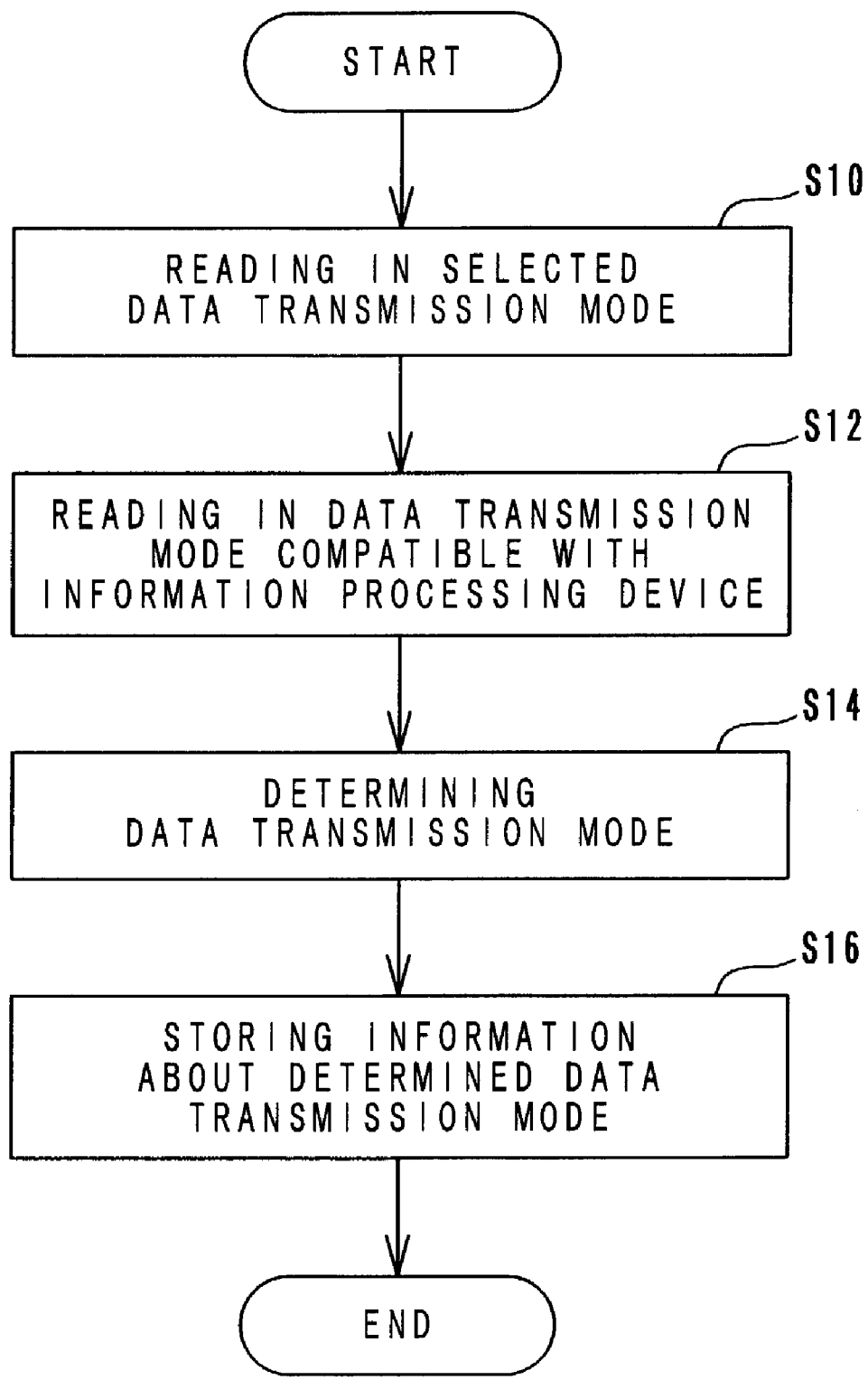
FIG. 5 is a flowchart which shows an example of determining a data transmission mode.

Now, determination of a data transmission mode made by the control section 30 is described with reference to FIGS. 5 and 6. FIG. 5 is a flowchart which shows an example of determining a data transmission mode, and FIG. 6 shows an example of setting the data transmission mode.

As FIG. 5 shows, first, at step S10, the control section 30 reads information about the data transmission mode selected by the mode selection switch 42. Next, at step S12, the control section 30 collects information about the optimal data transmission mode for the information processing device 12, for example, by reading information from the information processing device 12 and by referring to the results of a data transmission trial in a temporarily selected data transmission mode. At step S12, more specifically, the control section 30 compares available resources in a memory of the information processing device 12 with the volume of resources which is required for data transmission by a memory mapped I/O, and thereby, the control section 30 determines whether the information processing device 12 is compatible with the memory-mapped I/O. The available resources in the memory of the information processing device 12 are determined by information stored in the information processing device 12, and the necessary volume of resources is determined by information stored in the program storing section as part of the program or data for the program. Also, the control section 30 performs a data transmission trial in a specified data transmission mode, and based on the results of the trial (for example, occurrences or non-occurrences of transmission errors), the control section 30 determines whether or not bus master control in which data reading/data writing from/into the system memory 40 are directly performed without the control section 30 is possible, whether or not burst transmission of a plurality of blocks of data is possible in the bus master control and about other possible ways.

Subsequently, at step S14, the control section 30 determines a data transmission mode which is included in the data transmission mode read in at step S10 (that is, the data transmission mode selected by the mode selection switch 42) and also included in the possible data transmission modes determined at step S12 (that is, the data transmission modes which the information processing device 12 is compatible with) and which permits the fastest data transmission as the data transmission mode which is to be used.

Now, referring to FIG. 6, a specific example of determining a data transmission mode is described. In the example of FIG. 6, either a 16-bit-wide data transmission mode (a) or a card bus (32-bit-wide) data transmission mode (b) can be selected with the mode selection switch 42. The 16-bit-wide data transmission mode (a) includes an I/O mapped I/O data transmission mode (a1) and a memory mapped I/O data transmission mode (a2). The card bus data transmission mode (b) includes a mode (b1) in which the control section 30 controls data transmission between the memory buffer 24 and the information processing device 12, modes (b2 and b3) in which the host controller 32 works as a bus master to control data transmission between the memory buffer 24 and the information processing device 12, and a mode (b3) in which in the bus master transmission, burst transmission to transmit a plurality of blocks of data serially is possible. These data transmission modes have priorities in accordance with the data transmission speed, and the mode which permits the highest data transmission speed has priority over the other modes. For example, when selection of the card bus (32-bit-wide) data transmission mode (b) is recognized at step S10, and when it is confirmed at step S12 that the information processing device 12 is compatible with all three modes (b1 through b3), the control section 30 determines the bus master burst transmission mode (b3) which permits the highest data transmission speed as the data transmission mode which is to be used. Further, at step S12, the control section 30 may determine the compatibility of the information processing device 12 with the data transmission modes one by one, starting at the mode which permits the highest speed (according to the priority). In this case, as soon as the compatibility of the information processing device 12 with a mode is confirmed, the mode is determined as the data transmission mode which is to be used (at step S14).

Preferably, data transmission in the 16-bit-wide data transmission mode is carried out by the first data transmission route 26 (see FIG. 2), and data transmission in the card bus data transmission mode is carried out by the second data transmission route 28 (see FIG. 2). With this arrangement, data transmission for the respective specifications is carried out efficiently. In the I/O mapped I/O mode (a1), instruction decoding is time consuming, and the data transmission speed in the I/O mapped I/O mode (a1) is lower than that in the memory mapped I/O mode (a2). The data transmission speed in the bus master data transmission modes (b2 and b3) is higher than the data transmission mode controlled by the control section 30 (b1), since the modes (b2 and b3) require less processing. Further, the data transmission speed in the bus master burst transmission mode (b3) is higher than that in the mode (b2), since in the mode (b3), a greater volume of data is transmitted at a smaller number of accesses.

Then, the control section 30 stores a parameter which indicates the data transmission mode determined at step S14 in a specified information storing section (for example, in the system memory 40 or the register 38 thereof shown in FIG. 2) at step S16. The control section 30 of the information processing device 12 and the respective sections of the interface card 10 recognize the determined data transmission mode by referring to the parameter stored in the storing section.

The steps S10 through S16 are carried out a plurality of times while the interface card 10 is inserted in the information processing device 12. As already mentioned, it is determined from the volume of available resources whether the memory mapped I/O mode is possible. The volume of available resources changes in accordance with the usage of the information processing device 12, and even if the memory mapped I/O mode is not possible in the present moment, there may be a case in which the memory mapped I/O mode becomes possible later. Therefore, the control section 30 performs the procedure from step S10 to step S16 a plurality of times at specified intervals, such that the fastest data transmission mode is selected at all times. The control section 30 may repeat the procedure from step S10 to step S16 at predetermined regular intervals. Alternatively, the control section 30 may monitor the volume of available resources, and when an increase in volume (or an increase in volume of available resources over the necessary volume of resources for the memory mapped I/O mode) is detected, the control section 30 performs the procedure. Also, the control section 30 may perform a data transmission trial in a specified mode (for example, in a faster data transmission mode than the currently selected data transmission mode) at specified intervals as described above, and based on the results of the trial, a data transmission mode may be newly determined. Further, the procedure from step S10 through step S16 can be performed simultaneously with data transmission especially when the host controller 32 controls the data transmission.

Figure 7:
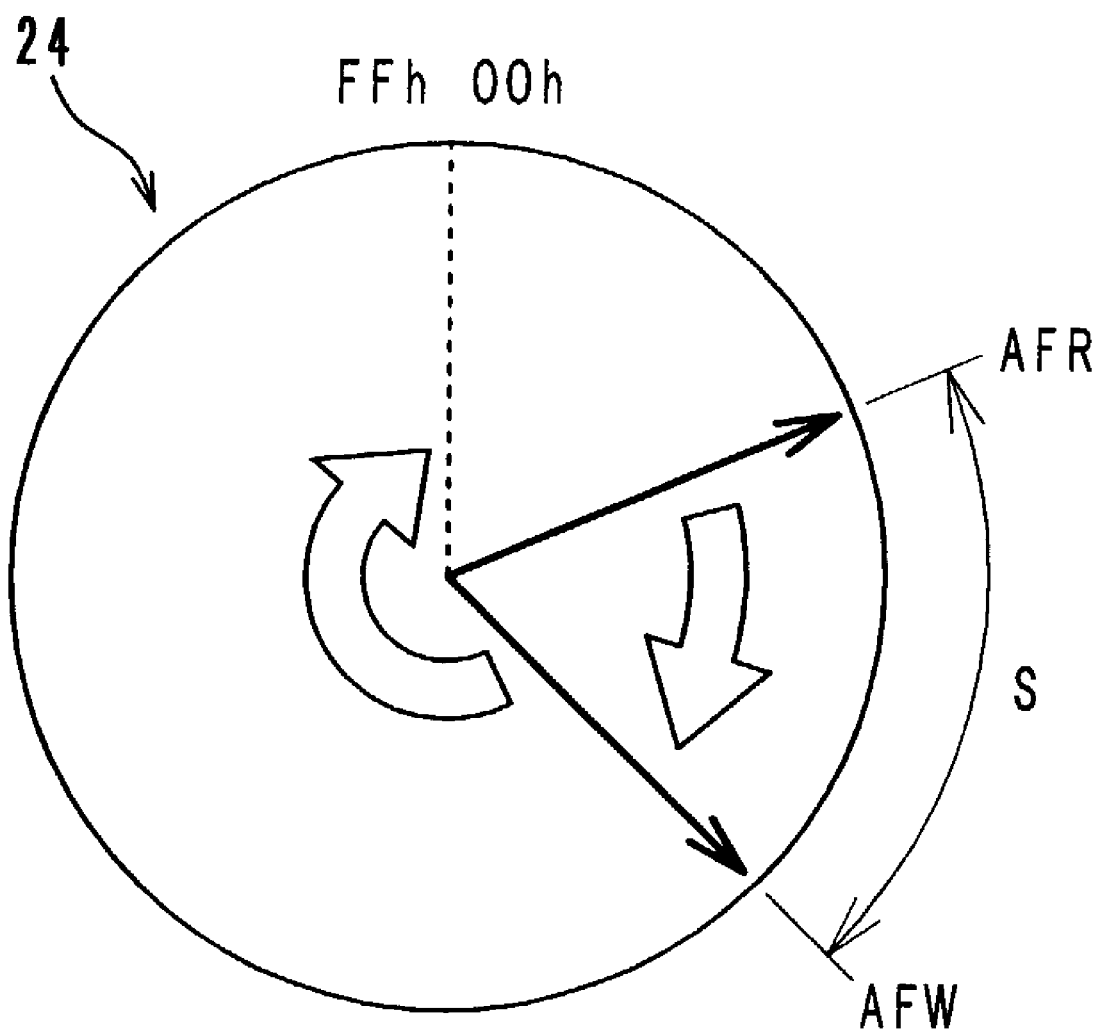
FIG. 7 is an illustration which shows the data storing status of a memory buffer of the interface card according to a preferred embodiment of the present invention.
Figure 8:
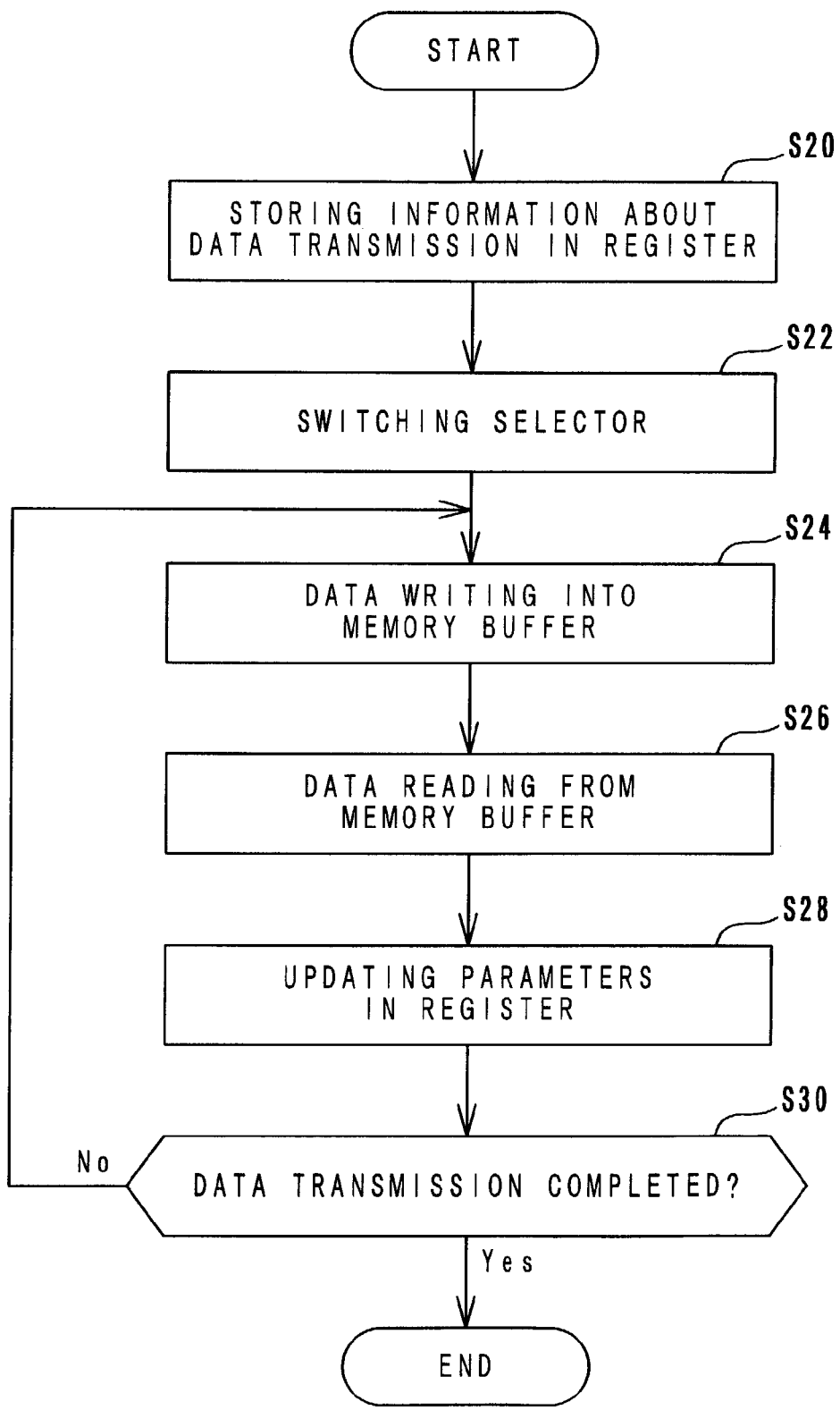
FIG. 8 is a flowchart which shows an example of carrying out data transmission via the memory buffer of the interface card according to a preferred embodiment of the present invention.

Next, referring to FIGS. 2, 7 and 8, data transmission via the memory buffer 24 is described. FIG. 7 shows addresses in the memory buffer 24 which are to be accessed for data writing and data reading into and from the memory buffer 24, and FIG. 8 is a flowchart which shows an example of data transmission via the memory buffer 24. As FIG. 7 shows, the memory buffer 24 is preferably a ring FIFO (first in first out) memory. When the address to be accessed for data writing is AFW and when the address to be accessed for data reading is AFR (if each address is for one byte), the volume of data S stored in the memory buffer 24 and to be transmitted therefrom is calculated as follows:

$$S = AFW - AFR$$

When S=0, in the memory buffer 24, there are no data to be transmitted, or the memory buffer 24 is full of data to be transmitted. Data writing and data reading into and from the memory buffer 24 are controlled by the data transmission control section such that the status $S \geq 0$ will be maintained.

Next, referring to FIG. 8, an example of data transmission via the memory buffer 24 is described. First, at step S20, the data transmission control section (the control section 30 of the information processing device 12, the host controller 32 or the medium controller 34) stores information about data transmission, such as the parameter PDR indicating the direction of data transmission, the parameter PDS indicating the size of data to be transmitted, the address AS in the system memory 40 to be accessed (the address which an access is to be started with), the address AM in the medium 14 to be accessed (the address which an access is to be started with) and other information, in the register 38.

Also, at step S20, the subsidiary control section 36 stores information about data transmission, such as the data storage parameter PDB (no data are stored before the start of data transmission, and the initial value is, for example, "0"), the transmitted data counter PTC (the initial value before the start of data transmission is equal to the size of data to be transmitted), the address AFW in the memory buffer 24 for writing and the address AFR in the memory buffer 24 for reading (the address AFR is equal to the address AFW before the start of data transmission) and other information, in the register 38.

Next, at step S22, the subsidiary control section 36 switches the selector 25 in accordance with the parameter PDR indicating the direction of data transmission stored in the register 38. More specifically, when data transmission is to be performed from the information processing device 12 to the medium 14, the subsidiary control section 36 connects the data writing port 24a of the memory buffer 24 to the host I/F 20 and connects the data reading port 24b of the memory buffer 24 to the media I/F 22. On the other hand, for data transmission from the medium 14 to the information processing device 12, the subsidiary control section 36 connects the data writing port 24a of the memory buffer to the medium I/F 22 and connects the data reading port 24b of the memory buffer to the host I/F 20.

At step S24, a data transmission control section which is located at an upstream location of the memory buffer 24 writes data which were read from an upstream device thereof (the system memory 40 or the medium 14) into the writing address AFW in the memory buffer 24, while referring to the transmitted data counter PTC and the data storage parameter PDB. More specifically, the upstream data transmission control section continues the data writing until the value of the transmitted data counter PTC, which has a decrement controlled by the subsidiary control section 36 every time a byte of data is written, becomes "0". Also, the upstream data transmission control section controls the data writing speed while referring to the data storage parameter PDB such that the memory buffer 24 will not be full of data which have been written thereto and which have not been read therefrom. When the data transmission occurs in a direction from the information processing device 12 to the medium 14, the upstream data transmission control section is preferably the control section 30 of the image processing device 12 or the host controller 32, and on the other hand, when the data transmission occurs in a direction from medium 14 to the information processing device 12, the upstream data transmission control section is preferably the medium controller 34.

At step S26, a data transmission control section which is located at a downstream position of the memory buffer 24 writes data which were read from the reading address AFR in the memory buffer 24 into a downstream device (the medium 14 or the system memory 40), while referring to the data storage parameter PDB stored in the register 38. More specifically, the downstream data transmission control section continues the data reading from the memory buffer 24 until the data storage parameter PDB indicates that the memory buffer 24 is emptied of data (for example, until the parameter becomes "0"). When the data transmission occurs in a direction from the information processing device 12 to the medium 14, the downstream data transmission control section is preferably the medium controller 34, and on the other hand, when the data transmission occurs in a direction from medium 14 to the information processing device 12, the downstream data transmission control section is preferably the control section 30 of the information processing device 12 or the host controller 32.

The subsidiary control section 36 monitors the storing status of the memory buffer 24, and every time data in the memory buffer 24 are updated at step S24 or at step S26, the subsidiary control section 36 changes the parameters in the register 38 at step S28. More specifically, every time a byte of data is written in the memory buffer 24, the subsidiary control section 36 provides an increment to the writing address AFW and simultaneously provides a decrement to the transmitted data counter PTC. Also, every time a byte of data is read out from the memory buffer 24, the subsidiary control section 36 provides an increment to the reading address AFR. Further, the subsidiary control section 36 reads the data storage parameter PDB which changes in accordance with the writing address AFW and the reading address AFR. The data storage parameter PDB may be the volume S of stored data described above. Thus, the parameters in relation to data transmission are updated by the subsidiary control section 36, not by the data transmission control sections which actually carry out data transmission. Thereby, the load on the data transmission control sections is reduced, and faster data transmission is achieved. The data transmission control section, while referring to information which was processed by the subsidiary control section 36 and stored in the register 38 (for example, the data storage parameter PDB and the transmitted data counter PTC), controls data transmission. In other words, the information processed by the subsidiary control section 36 is providing information to perform data transmission via the memory buffer 24.

Next, at step S30, the data transmission control sections which are located at an upstream location and at a downstream location of the memory buffer 24 determine whether the data transmission has been completed. More specifically, the upstream control section stops the data writing into the memory buffer 24 when the value of the transmitted data counter PTC becomes "0", and the downstream control section stops the data reading from the memory buffer 24 when the data storage parameter PDB indicates that the memory buffer 24 is emptied of data (for example, when the data storage parameter PDB indicates "0"). Unless the data transmission has been completed, the processing at step S24 and/or at step S26 is performed.

In the processing at step S24 and at step S26, the data transmission control sections obtain information about the address from which data are to be read and the address into which data are to be written, that is, the address AS in the system memory 40 to be accessed and the address AM in the medium 14 to be accessed. For example, every time a byte of data is written into or read from the memory buffer 24 at step S24 or at step S26, the subsidiary control section 36 provides an increment or a decrement to the address AS or the address AM. Also, only the access starting addresses of the system memory 40 and the medium 14 are stored in the register 38, and in this case, the addresses in the system memory 40 and the medium 14 to be accessed are determined from the access starting addresses and the number of transmitted data which is, for example, indicated by the transmitted data counter PTC.

Figure 9:
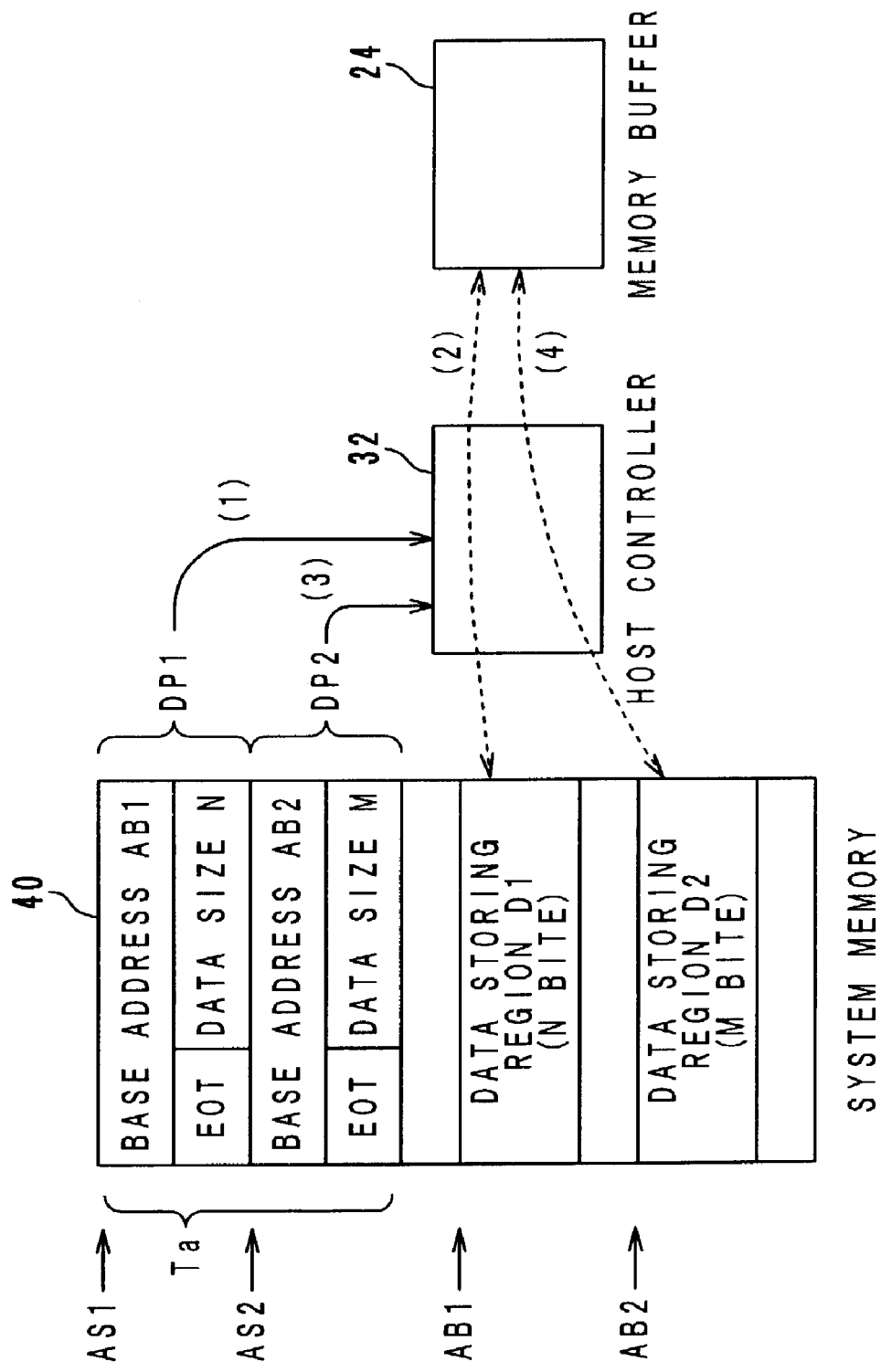
FIG. 9 is an illustration which shows an example of data transmission which is controlled by a host control section of the interface card according to a preferred embodiment of the present invention.
Figure 10:
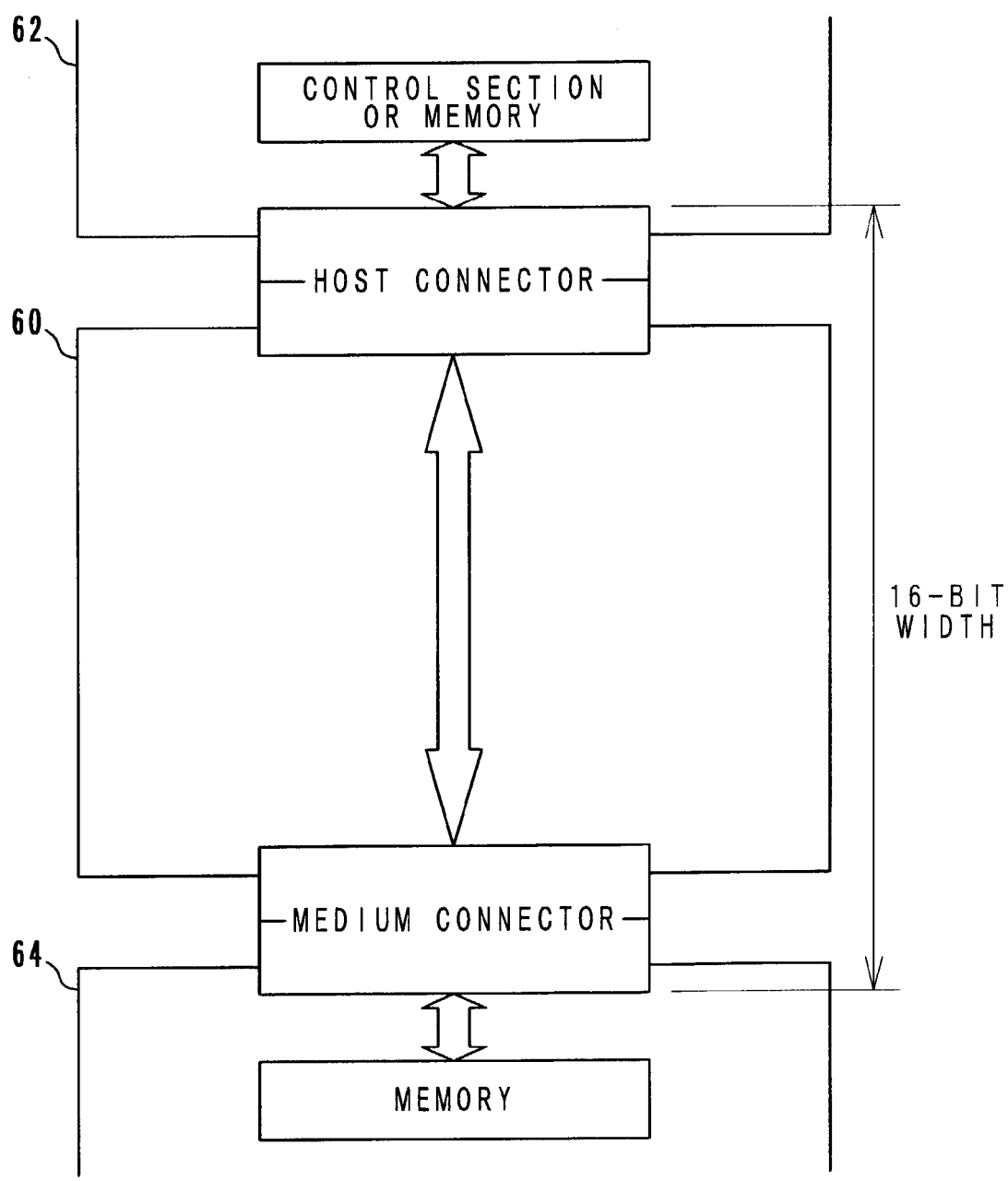
FIG. 10 is an illustration which shows data transmission by use of a conventional interface card.
Figure 11:
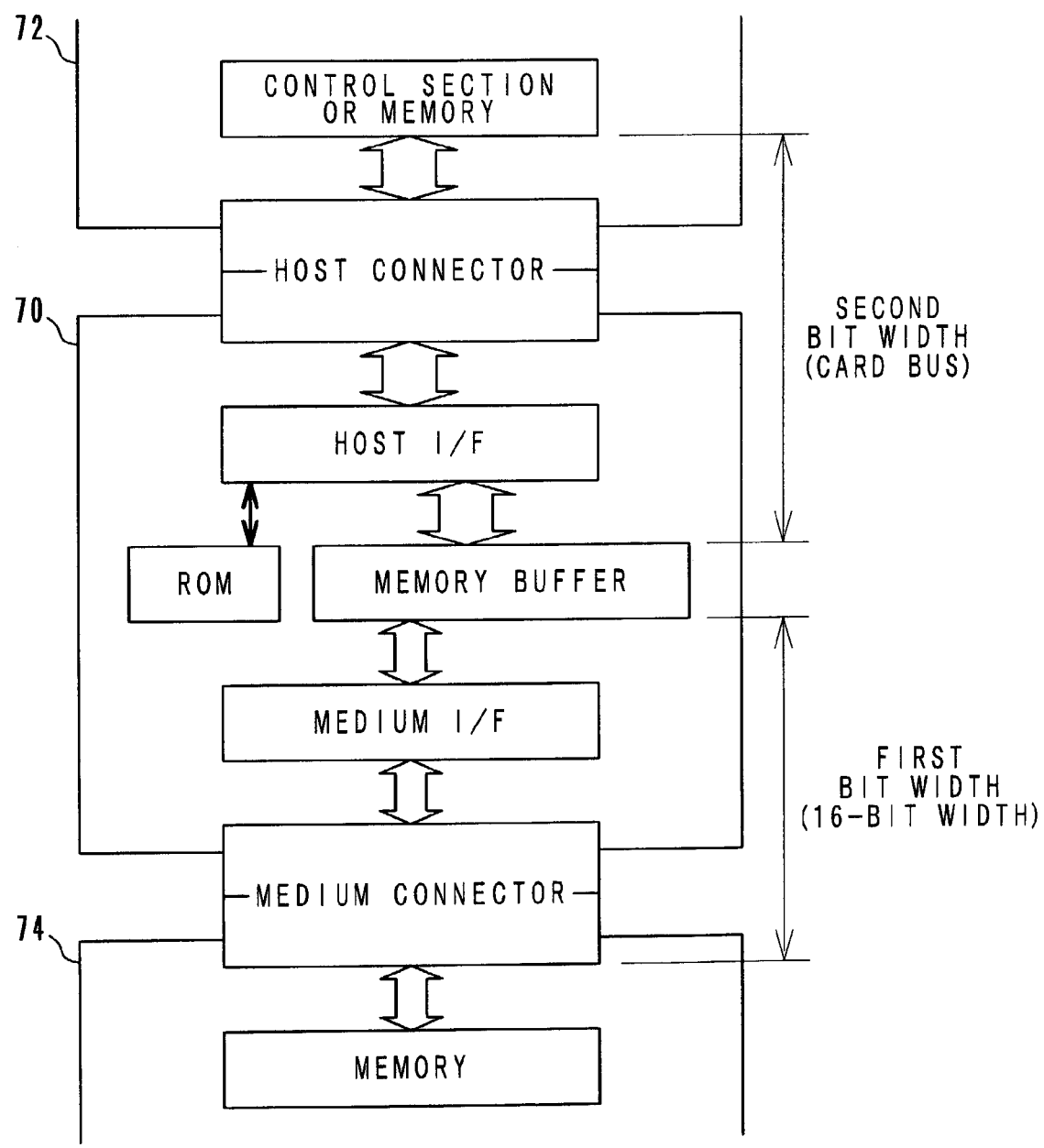
FIG. 11 is an illustration which shows data transmission by use of a conventional interface card with a memory buffer.

When the host controller 32 serves as a control section for data transmission between the memory buffer 24 and the system memory 40 of the information processing device 12 (in this case, the host controller 32 serves as a bus master), the host controller 32 recognizes the address in the system memory 40 to be accessed by referring to an address designating table stored in the system memory 40. FIG. 9 shows a concept of data transmission controlled by the host controller 32 using an address designating table. As FIG. 9 shows, the system memory 40 is stored with an address designating table Ta including a plurality of pieces of pointer data DP1 and DP2 which include base addresses AB1 and AB2 which are access starting addresses in respective data storage blocks, data sizes N and M (for example, the number of bytes) and completion flags EOT which indicate, for example, continuity by "0" and stop by "1". In the system memory 40, actual data storage regions D1 (a region with a capacity of N bytes starting at the address AB1) and D2 (a region with a capacity of M bytes starting at the address AB2) are provided in correspondence with the pointer data DP1 and DP2.

When performing data transmission by use of an address designating table Ta, for example, at step S20, the control section 30 of the information processing device 12 produces an address designating table Ta and stores the table Ta in the system memory 40. Also, the control section 30 stores the starting address of the address designating table Ta in the register 38 as the access starting address AS in the system memory 40. Then, at step S24 or at step S26, the host controller 32 first reads in the pointer data DP1 by referring to the starting address AS of the address designating table Ta. With reference to the pointer data DP1, the host controller 32 starts data reading or data writing from or into the data storage region with a capacity of N bytes starting at the address AB1. Thereafter, when the flag EOT indicates continuity, the host controller 32 reads in the pointer data DP2, and with reference to the pointer data DP2, the host controller 32 starts data reading or data writing from or into the data storage region with a capacity of M bytes starting at the address AB2. In data transmission using such an address designating table Ta, even if a large storage region is not available in the system memory 40, scattered smaller storage regions are used. Also, a relatively large amount of data including a plurality of blocks is transmitted at a smaller number of accesses, and faster data transmission is achieved.

Programs which enable the control section 30 of the information processing device 12 to function in the above-described manner (that is, function as a data transmission mode determining section and as a data transmission controller) are stored in a storage medium which are read by a computer (for example, a CD-ROM, a DVD, an MO or other media). The programs are read out by a removable device (not shown) which is installed in or connected to the information processing device 12 and is installed in a program storage section. At this moment, selective installation of one of the programs for one data transmission mode is not performed, but installation of a plurality of programs for a plurality of data transmission modes (preferably, installation of all of the programs) is performed for determination of a data transmission mode and for execution of data transmission. With this arrangement, as already mentioned, even once a data transmission mode has been determined, it is possible to perform the procedure for determining a data transmission mode (from step S10 to step S16) at appropriate times such that an optimal (faster) data transmission mode is selected in accordance with changes in the usage status of the information processing device 12. Further, information which is necessary for determination of a data transmission mode (for example, possible data transmission modes, the priority, information about the volume of resources which is necessary for each data transmission mode and other information) is also installed simultaneously with the programs.

As described above, an interface card according to preferred embodiments of the present invention includes a data transmission mode switching device, and a data transmission mode which permits faster data transmission in the environment selected. Further, an information processing device selects an optimal data transmission mode for the environment, that is, a mode which permits the fastest data transmission in the environment, and thereby, faster data transmission is achieved. Also, because a memory buffer is located in a data transmission route, different transmission modes are selected before and after the memory buffer, and thereby, faster data transmission is achieved.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An interface card for a medium which is capable of being inserted into and ejected from a card slot of an information processing device while holding the medium therein and which has a data transmission route used for data transmission between the information processing device and the medium, said interface card comprising:
   a memory buffer for storing data transmitted through the data transmission route; and
   a data transmission mode selecting device for selecting a data transmission mode from a plurality of data transmission modes; wherein
   the plurality of data transmission modes are used for data transmission through the data transmission route;
   different data transmission modes are selected for data transmission between the information processing device and the memory buffer and for data transmission between the medium and the memory buffer; and
   the data transmission route includes a first route for data transmission between the information processing device and the medium via the memory buffer and a second route for data transmission between the information processing device and the medium not via the memory buffer.

2. An interface card for a medium according to claim 1, wherein with the data transmission mode selecting device, a 16-bit-wide data transmission mode and a 32-bit-wide data transmission mode are selectable.

3. An interface card for a medium according to claim 1, wherein the data transmission selecting device is a mechanical switch.

4. An interface card for a medium according to claim 1, wherein the memory buffer is a dual port RAM.

5. An interface card for a medium which is capable of being inserted into and ejected from a card slot of an information processing device while holding the medium therein and which has a data transmission route used for data transmission between the information processing device and the medium, said interface card comprising:
   a memory buffer for storing data transmitted through the data transmission route; and
   a data transmission mode selecting device for selecting a data transmission mode from a plurality of data transmission modes; wherein
   the plurality of data transmission modes are used for data transmission through the data transmission route;
   the data transmission route includes a first route for data transmission between the information processing device and the medium via the memory buffer and a second route for data transmission between the information processing device and the medium not via the memory buffer; and
   a data transmission mode which uses the first route via the memory buffer and a data transmission mode which uses the second route not via the memory buffer are selectable with the data transmission mode selecting device.

6. An interface card for a medium according to claim 5, wherein with the data transmission mode selecting device, a 16-bit-wide data transmission mode and a 32-bit-wide data transmission mode are selectable.

7. An interface card for a medium according to claim 5, wherein the data transmission selecting device is a mechanical switch.

8. An interface card for a medium according to claim 5, wherein the memory buffer is a dual port RAM.

9. An interface card for a medium which is capable of being inserted into and ejected from a card slot of an information processing device while holding the medium therein and which has a data transmission route used for data transmission between the information processing device and the medium, said interface card comprising:
   a memory buffer for storing data transmitted through the data transmission route; and
   a data transmission mode selecting device for selecting a data transmission mode from a plurality of data transmission modes; wherein
   the plurality of data transmission modes are used for data transmission through the data transmission route;
   a data transmission mode to perform data transmission via the memory buffer is selectable with the data transmission mode selecting device;
   the memory buffer includes a host control section for controlling data transmission between the information processing device and the memory buffer and a medium control section for controlling data transmission between the medium and the memory buffer which perform data reading from the memory buffer and data writing into the memory buffer, respectively, in parallel; and
   the data transmission route includes a first route for data transmission between the information processing device and the medium via the memory buffer and a second route for data transmission between the information processing device and the medium not via the memory buffer.

10. An interface card for a medium according to claim 9, wherein the medium control section is provided in the interface card.

11. An interface card for a medium according to claim 9, wherein the host control section is provided in the interface card.

12. An interface card for a medium according to claim 9, further comprising an instructing information producing section which reads information about a data storing status of the memory buffer and which produces instructing information to allow the medium control section and/or the host control section to carry out data transmission via the memory buffer.

13. An interface card for a medium according to claim 9, wherein with the data transmission mode selecting device, a 16-bit-wide data transmission mode and a 32-bit-wide data transmission mode are selectable.

14. An interface card for a medium according to claim 9, wherein the data transmission selecting device is a mechanical switch.

15. An interface card for a medium according to claim 9, wherein the memory buffer is a dual port RAM.

16. A program for carrying out data transmission between an information processing device and a medium by using the interface card according to claim 1, the program commanding the information processing device to execute the following steps:

reading information about a data transmission mode selected with the data transmission mode selecting device;

reading information about a data transmission mode which the information processing device is compatible with; and selecting a data transmission mode to be used for data transmission from a group consisting of the data transmission mode selected with the data transmission mode selecting device and the data transmission mode which the information processing device is compatible with, in consideration of a data transmission speed.

17. A program for carrying out data transmission between an information processing device and a medium according to claim 16, the program further commanding the information processing device to execute the step of starting data transmission between the information processing device and the memory buffer.

18. A program for carrying out data transmission between an information processing device and a medium by using the interface card according to claim 5, the program commanding the information processing device to execute the following steps:

reading information about a data transmission mode selected with the data transmission mode selecting device;

reading information about a data transmission mode which the information processing device is compatible with; and selecting a data transmission mode to be used for data transmission from a group consisting of the data transmission mode selected with the data transmission mode selecting device and the data transmission mode which the information processing device is compatible with, in consideration of a data transmission speed.

19. A program for carrying out data transmission between an information processing device and a medium according to claim 18, the program further commanding the information processing device to execute the step of starting data transmission between the information processing device and the memory buffer.

20. A program for carrying out data transmission between an information processing device and a medium by using the interface card according to claim 9, the program commanding the information processing device to execute the following steps:

reading information about a data transmission mode selected with the data transmission mode selecting device;

reading information about a data transmission mode which the information processing device is compatible with; and selecting a data transmission mode to be used for data transmission from a group consisting of the data transmission mode selected with the data transmission mode selecting device and the data transmission mode which the information processing device is compatible with, in consideration of a data transmission speed.

21. A program for carrying out data transmission between an information processing device and a medium according to claim 20, the program further commanding the information processing device to execute the step of starting data transmission between the information processing device and the memory buffer.

* * * * *